United States Patent [19]
Choi et al.

[11] Patent Number: 6,094,250
[45] Date of Patent: Jul. 25, 2000

[54] IPS MODE TFT-LCD AND METHOD FOR FABRICATING THE SAME

[75] Inventors: Woo Ho Choi; Seok Lyul Lee, both of Seoul, Rep. of Korea

[73] Assignee: Hyundai Electronics Industries Co., Ltd., Kyoungki-do, Rep. of Korea

[21] Appl. No.: 09/207,842

[22] Filed: Dec. 8, 1998

[30] Foreign Application Priority Data

Dec. 8, 1997 [KR] Rep. of Korea .................... 97-66715

[51] Int. Cl.[7] ............................................. G02F 1/1373
[52] U.S. Cl. ............................................. 349/141; 349/143
[58] Field of Search ................................. 349/141, 143, 349/139

[56] References Cited

U.S. PATENT DOCUMENTS 5,671,027  9/1997  Sasano et al. ......................... 349/46
5,959,708  12/1999  Lee et al. .............................. 349/143
5,969,782  10/1999  Lee et al. .............................. 349/141

FOREIGN PATENT DOCUMENTS 10073844  3/1998  Japan ............................. G02F 1/136

*Primary Examiner*—James A. Dudek
*Attorney, Agent, or Firm*—Ladas & Parry

[57] ABSTRACT

An IPS mode TFT-LCD and method for fabricating the same are disclosed. The IPS mode TFT-LCD includes a gate electrode interconnection; a pixel electrode formed on the same layer with the gate electrode interconnection; a first common electrode formed on the same layer with the gate electrode interconnection; a gate insulating layer formed on a substrate and covering each electrode; a data electrode formed on the upper of the gate insulating layer perpendicularly to the first common electrode; and a second common electrode which is formed on the same layer with the data electrode, parallel thereto and simultaneously in contact with the pixel electrode and the first common electrode.

9 Claims, 2 Drawing Sheets

IPS MODE TFT-LCD AND METHOD FOR FABRICATING THE SAME

BACKGROUND OF THE INVENTION

1. Field of the Invention

The present invention is related to a liquid crystal display and method for fabricating the same, more particularly to an In-Plane Switching mode thin film transistor-liquid crystal display(hereinafter IPS mode TFT-LCD) and a method for fabricating the same.

2. Description of the Related Art

As one of active liquid crystal display devices, the TFT-LCD has been used in the various portable display devices such as a notebook and a personal computer due to its characteristics of thin thickness, low weight, less power consumption and the like. It is now more frequently used for the office automation devices such as monitors.

The IPS mode TFT-LCD may be divided into two modes of operation corresponding to the formation of its electric field, i. e. a Twisted Nematic (TN) mode driven by the homeotropic electric field and an IPS mode driven by the homogeneous electric field. The IPS mode has been developed and used for improving the characteristics of optical viewing angle.

A conventional TFT-LCD device is illustrated in FIG. 1a and FIG. 1b. FIG. 1a is a plane view for showing a pixel structure of the conventional IPS mode TFT-LCD and FIG. 1b is a cross-sectional view taken along the line 1A–1A' shown in FIG. 1a.

Referring to FIG. 1a and FIG. 1b, the conventional IPS mode TFT-LCD includes a common electrode 12 formed on an upper of a transparent substrate 10, a gate insulating layer 13 formed over the substrate 10 including the common electrode 12, and a data electrode 14 and a pixel electrode 15 formed on the gate insulating layer 13. A protection layer 16 is formed on a resultant of the substrate 10 where the data bus line 14 and the pixel electrode 15 are formed. The numeral 11 shown in FIG. 1a without any description is a gate bus line.

The IPS mode TFT-LCD has more influences of the lateral field than the TN mode TFT-LCD so that it is very difficult to prevent cross-talk since the IPS mode TFT-LCD is driven by the homogeneous electric field. The data electrode 14 and the pixel electrode 15 of the conventional IPS mode TFT-LCD shown in FIG. 1a and FIG. 1b are formed on the same insulating layer 13. There are frequent influences of the electric signal flowing through the data electrode 14 upon the pixel electrode 15. Therefore it is a problem that the cross-talk often occurs.

SUMMARY OF THE INVENTION

Accordingly, the present invention is directed to solve the above described problems in the conventional IPS mode TFT-LCD. It is an object of the present invention to provide an IPS mode TFT-LCD that the cross-talk is decreased by preventing the electric signal through a data electrode from affecting upon a pixel electrode and a method for fabricating the same.

So as to accomplish the above object of the present invention, it is provided to an IPS mode TFT-LCD comprises: a gate bus line and a pixel electrode formed on a transparent substrate; first common electrodes formed on the same transparent substrate with the gate bus line and disposed in parallel to the gate bus line; a gate insulating layer formed on the substrate to cover the gate bus line, the pixel electrode and the first common electrodes, the gate insulating layer having contact holes; a data bus line formed on the gate insulating layer and perpendicular to the first common electrodes; and second common electrodes which are formed in parallel to the data bus line on the same gate insulating layer with the data bus line and being in contact with the pixel electrode and the first common electrodes through the contact holes.

It is also provided to a method of fabricating an IPS mode TFT-LCD comprises the steps of: forming a first metal layer on a transparent substrate; forming a first metal layer on a transparent substrate; forming a gate bus line, first common electrodes parallel to the gate bus line and a pixel electrode perpendicular to the gate bus line on the same substrate by patterning the first metal layer; forming a gate insulating layer on the substrate including the gate bus line, the pixel electrode and the first common electrodes; forming a Si-layer on the gate insulating layer and patterning the a-Si layer, thereby forming an active layer to expose the gate insulating layer; forming contact hole on the gate insulating layer to expose selected regions of the pixel electrode and the first common electrodes; forming a second metal layer to be buried with the contact holes on the gate insulating layer including the active layer; and patterning the second metal layer to form second common electrodes which is perpendicularly connected to the first common electrode through the contact holes, a data bus line being in parallel to the second common electrodes and a first and a second storage capacitor electrodes being in contact with the pixel electrode.

According to this invention, the cross-talk can be decreased remarkably since the data electrode and the pixel electrode are positioned at different layers each other and then the pixel electrodce influenced by the electric signal through the data electrode is decreased.

Hereinafter, a preferred embodiment of the present invention will be described with reference to the attached drawings.

BRIEF DESCRIPTION OF THE DRAWINGS

FIG. 1b is a cross-sectional view taken along the line 1A–1A' shown in FIG. 1a.

FIG. 2b is a cross-sectional view taken along the line 2B–2B' shown in FIG. 2a.

DETAILED DESCRIPTION OF THE PREFERRED EMBODIMENTS

Figure 1A:
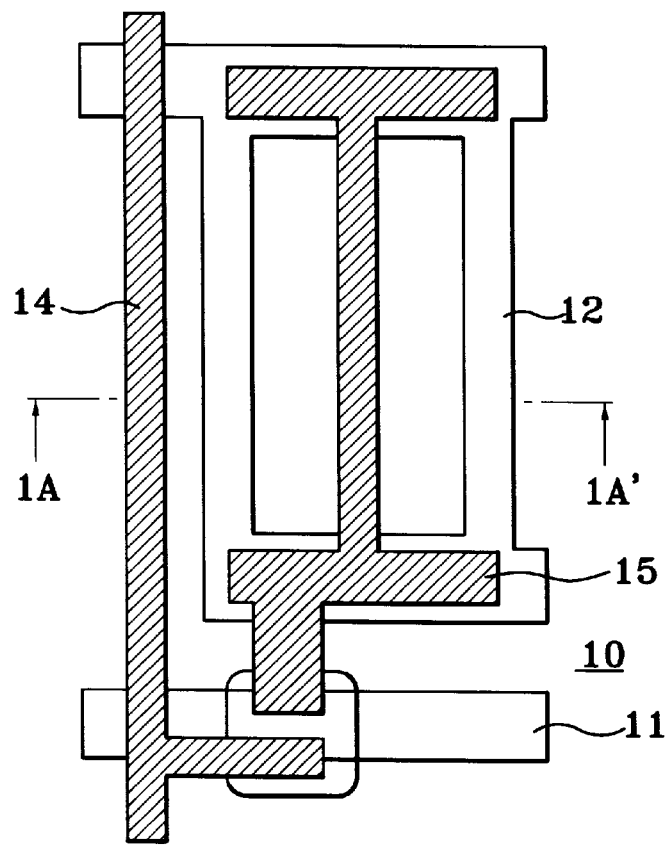
FIG. 1a is a plane view for showing a pixel structure of a conventional IPS mode TFT-LCD.
Figure 1B:
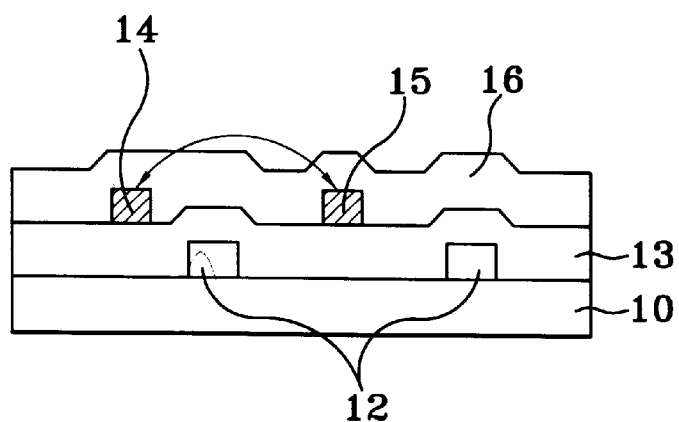
Figure 2A:
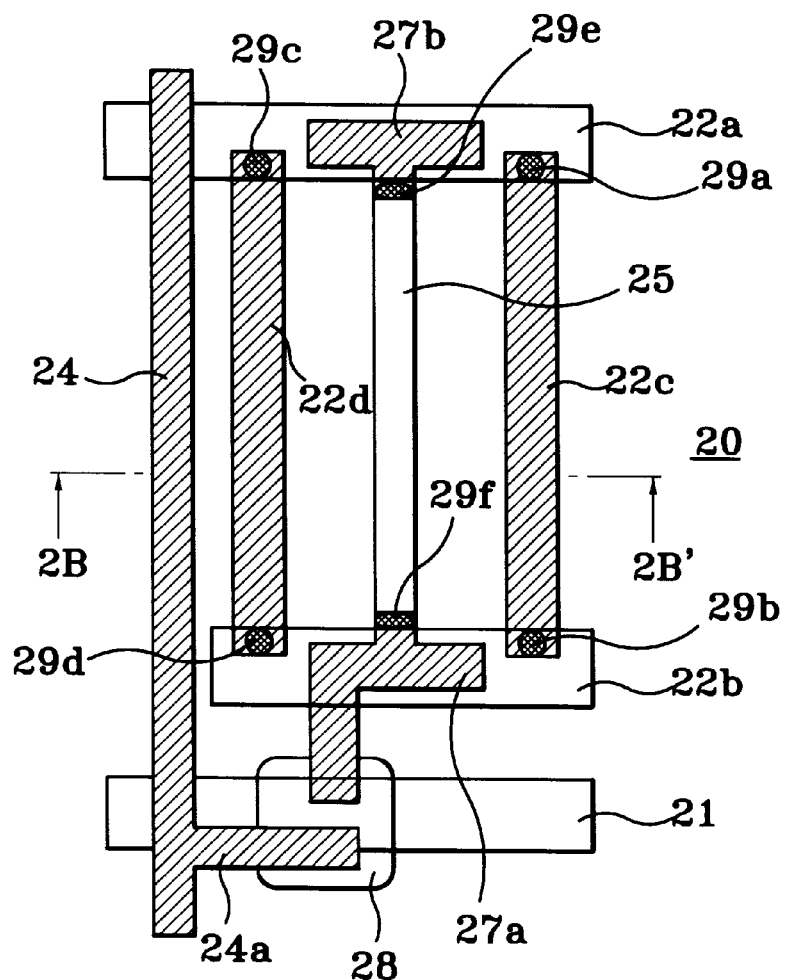
FIG. 2a is a plane view or showing a pixel structure of an IPS mode TFT-LCD according to a preferred embodiment of the present invention.
Figure 2B:
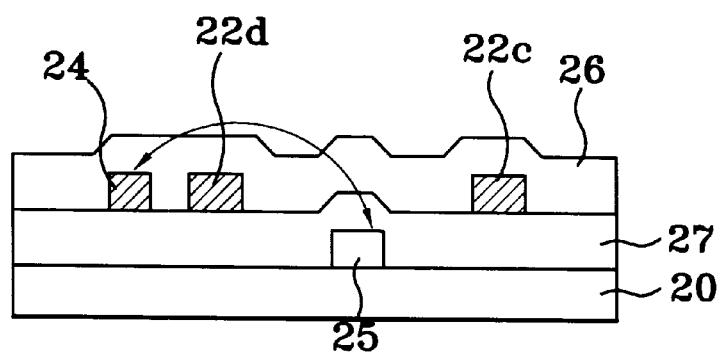

Referring to FIG. 2a and 2b, a pixel electrode 25 formed on a transparent glass substrate 20 is provided with the TFT-LCD according to the present invention. First common electrodes 22a and 22b which are perpendicular to the pixel electrode 25 and a gate bus line 21 which is disposed in parallel to the first common electrodes 22a and 22b are formed on the same layer, that is on the substrate 20, with the pixel electrode 25. A gate insulating layer 27 is formed on the substrate 20 to simultaneously cover the gate bus line 21, the first common electrodes 22a and 22b and the pixel electrode 25. An a-Si active layer 28 for a thin film transistor (not shown in drawing) is formed on the gate insulating layer 27 over a gate electrode (not shown in drawings) connected to the gate bus line 21.

Furthermore, second common electrodes 22c and 22d and a data bus line 24 which are made of the same material for source and drain electrode material, are formed on the gate insulating layer 27. The respective widths of the second common electrodes 22c and the 22d are as large as one and half times of the width of the data bus line 24. The second common electrodes 22c and 22d are arranged perpendicular to the arrangement direction of the first common electrodes 22a and 22b and connected to the first common electrodes 22a and 22b through four contacts 29a, 29b, 29c and 29d. Accordingly, the first common electrodes and the second common electrodes 22a, 22b, 22c and 22d make a quadrilateral and the data bus line 24 is parallel to the pixel electrode 25. A branch 24a is formed at the data bus line 24 so that the data electrode 24 and the active layer 28 are connected each other by the branch 24a.

On the other hand, a first storage capacitor electrode 27a and a second storage capacitor electrode 27b are formed on the same layer, that is on the gate insulating layer 27, with the second common electrodes 22c and 22d and they are connected to the pixel electrode 25 through contacts 29e and 29f, respectively. Furthermore, the first storage capacitor electrode 27a of the storage capacitor electrodes 27a and 27b is connected to the active layer 28.

According to the IPS mode TFT-LCD as shown in FIG. 2a and FIG. 2b, the influence of electric signal through the data electrode 24 on the pixel electrode 25 can be minimized since the data electrode 24 and the pixel electrode 25 are positioned at different layers each other.

Hereinafter, a method of fabricating the IPS mode TFT-LCD according to the present invention will be described.

First of all, a first metal layer made of Mo—W is formed on a transparent glass substrate 20 with thickness of 3000 Å to 5000 Å. The first metal layer is patterned by a method of dry etching, thereby forming a pixel electrode 25. In patterning the first metal layer for forming the pixel electrode 25, a gate bus line 21 and first common electrodes 22a and 22b are simultaneously formed on the substrate 20.

Afterwards, a gate insulating layers 27 is formed on the substrate 20 including the pixel electrode 25, the gate bus line 21 and first common electrodes 22a and 22b. Then, an s-Si layer is formed on the gate insulating layers 27 and patterned so as to form an active layer 28 shown in FIG. 2a. Consequently, a method of wet etching is performed at the gate insulating layer 27 so as to expose predetermined portions of the first common electrodes 22a and 22b and the pixel electrode 25, thereby forming contact holes 29a through 29f. Next, a second metal layer made of an alloy of Mo/Al/Mo is formed on the gate insulating layer 27. At this time, the contact holes 29a through 29f are buried with the second metal layer.

Next, the second metal layer is patterned thereby forming second common electrodes 22c and 22d and a data bus line having a branch 24a are formed. The second common electrodes 22c and 22d make a quadrilateral figure with the first common electrodes 22a and 22b and a data bus line 24 is formed parallel to the second common electrodes 22c and 22d and connected to the active layer 28 by the branch 24a. Here, the respective widths of the second common electrodes 22c and 22s are as large as one and half times of the width of the data electrode 24 when it is under the patterning process. At this time, the second common electrodes 22c and 22d are connected to the first common electrodes 22a and 22b through the contact holes 29a through 29d.

In patterning the second metal layer, a first storage capacitor electrode 27a connected to the active layer 28 and a second storage capacitor electrode 27b disposed opposit to the first storage capacitance electrode 27a are also formed on the gate insulating layer 27 and the first storage capacitor and a second storage capacitot 27b are simultaneously connected to the pixel electrode 25 through the contact holes 29e and 29f. Finally, a protection layer 26 is formed on the entire structure as shown in FIG. 2b.

According to this invention, the cross-talk can be decreased remarkably since the data electrode and the pixel electrode are positioned at different layers each other and then the influence of the electric signal through the data electrode is decreased.

Various changes and modifications can be made without departing from the spirit and the scope of the invention as defined by the following claims.

What is claimed is:

1. An in plane switching mode thin film transistor-liquid crystal device (IPS mode TFT-LCD) comprising:

a gate bus line and a pixel electrode formed on a transparent substrate;

first common electrodes formed on the same transparent substrate with the gate bus line and disposed in parallel to the gate bus line;

a gate insulating layer formed on the substrate to cover the gate bus line, the pixel electrode and the first common electrodes, the gate insulating layer having contact holes;

a data bus line formed on the gate insulating layer and perpendicular to the first common electrodes; and second common electrodes which are formed in parallel to the data bus line on the same gate insulating layer with the data bus line and being in contact with the pixel electrode and the first common electrodes through the contact holes.

2. The IPS mode TFT-LCD as claimed in claim 1, wherein the gate bus line, the pixel electrode and the first common electrodes are made of an alloy material of MO—W.

3. The IPS mode TFT-LCD as claimed in claim 1, further comprising:

a first storage capacitor electrode connected to the pixel electrode corresponding one of the contact holes and a second storage capacitor electrode connected to the the pixel electrode corresponding one of the contact holes.

4. The IPS mode TFT-LCD as claimed in claim 3, wherein the data bus line, the second common electrodes and storage capacitor electrodes are made of an alloy material of Mo/Al/Mo.

5. The IPS mode TFT-LCD as claimed in claim 1, wherein the thicknesses of the gate electrode, the pixel electrode and the second common electrode are in the range of 3000 Å to 5000 Å.

6. The IPS mode TFT-LCD of claim 1, wherein the width of the second common electrode is as large as one and half times of the width of the data electrode.

7. A method of fabricating an IPS mode TFT-LCD comprising the steps of:

forming a first metal layer on a transparent substrate;

forming a gate bus line, first common electrodes parallel to the gate bus line and a pixel electrode perpendicular to the gate bus line on the same substrate by patterning the first metal layer;

forming a gate insulating layer on the substrate including the gate bus line, the pixel electrode and the first common electrodes;

forming a Si-layer on the gate insulating layer and patterning the a-Si layer, thereby forming an active layer to expose the gate insulating layer;

forming contact hole on the gate insulating layer to expose selected regions of the pixel electrode and the first common electrodes;

forming a second metal layer to be buried with the contact holes on the gate insulating layer including the active layer; and patterning the second metal layer to form second common electrodes which is perpendicularly connected to the first common electrode through the contact holes, a data bus line being in parallel to the second common electrodes and a first and a second storage capacitor electrodes being in contact with the pixel electrode.

8. The method as claimed in claim 6, wherein the first metal layer is patterned by a method of dry etching.

9. The method as claimed in claim 6, the contact holes are formed by a method of wet etching.

* * * * *